(12) United States Patent
Matsumoto

(10) Patent No.: US 7,912,300 B2
(45) Date of Patent: Mar. 22, 2011

(54) IMAGE PROCESSING APPARATUS AND CONTROL METHOD THEREFOR

(75) Inventor: Yuki Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 11/833,437

(22) Filed: Aug. 3, 2007

(65) Prior Publication Data

US 2008/0069457 A1    Mar. 20, 2008

(30) Foreign Application Priority Data

Aug. 8, 2006  (JP) ................................. 2006-216258

(51) Int. Cl.
*G06K 9/36*    (2006.01)

(52) U.S. Cl. ..................................................... 382/232

(58) Field of Classification Search .......... 382/232–233, 382/236–251; 348/384.1, 390.1, 404.1, 420.1, 348/424.2; 358/426.01, 426.06, 426.08, 358/426.13, 426.14; 375/240, 240.02, 240.23, 375/240.24

See application file for complete search history.

(56) References Cited

U.S. PATENT DOCUMENTS

| | | | | |
|---|---|---|---|---|
| 6,021,224 A * | 2/2000 | Castelli et al. | ................. | 382/232 |
| 6,097,364 A | 8/2000 | Miyamoto et al. | ............... | 345/97 |
| 6,141,445 A * | 10/2000 | Castelli et al. | ................. | 382/232 |
| 7,454,070 B2 * | 11/2008 | Ito et al. | ........................ | 382/232 |
| 7,627,181 B2 * | 12/2009 | Tamura et al. | ................. | 382/232 |
| 7,680,345 B2 * | 3/2010 | Ito et al. | ........................ | 382/232 |
| 7,702,163 B2 * | 4/2010 | Saito et al. | ..................... | 382/232 |
| 7,747,097 B2 * | 6/2010 | van Baarsen et al. | .......... | 382/248 |
| 2005/0249283 A1 | 11/2005 | Kajiwara et al. | .......... | 375/240.12 |
| 2006/0045362 A1 | 3/2006 | Ito et al. | ........................ | 382/232 |
| 2006/0210176 A1 | 9/2006 | Kajiwara et al. | ............... | 382/232 |
| 2006/0262982 A1 | 11/2006 | Matsumoto et al. | ........... | 382/238 |

FOREIGN PATENT DOCUMENTS

JP    10-207645    8/1998

* cited by examiner

*Primary Examiner* — Jose L Couso

(74) *Attorney, Agent, or Firm* — Fitzpatrick, Cella, Harper & Scinto

(57) ABSTRACT

This invention suppresses mixing of different types of encoded data in an image area having a specific image property while allowing mixing of losslessly encoded data and lossily encoded data. For this purpose, an input unit inputs image on an image block basis. A conversion unit converts the resolution of the image data to ½ by generating one pixel from 2×2 pixels. A first encoding unit lossily encodes the converted image data. A second encoding unit losslessly encodes the image data for each image block. A selecting unit selects encoded data with a smaller code amount. A determination unit determines whether an image block of interest has a specific image property, and outputs the determination result to the selecting unit. If the image of interest has a specific image property, the selecting unit selects and outputs encoded data of the type set by a control unit in advance.

8 Claims, 12 Drawing Sheets

FIG. 5

| | Xc | Xb | Xd |
|---|---|---|---|
| | Xa | X | |

IMAGE PROCESSING APPARATUS AND CONTROL METHOD THEREFOR

BACKGROUND OF THE INVENTION

1. Field of the Invention

The present invention relates to an image processing apparatus and method which detect a specific image area in which a noticeable deterioration in image quality is caused by subsampling or the like, selecting an encoding scheme most suitable for the detected area, and encoding the area.

2. Description of the Related Art

Encoding techniques which are used to compress the amount of image data are roughly classified into two types, that is, a lossless encoding technique with little loss of information due to compression/decompression and a lossy encoding technique with a deterioration in image quality due to compression/decompression. In general, lossy encoding provides a higher compression ratio than lossless encoding, and allows adjusting the amount of code generated by changing the degree of deterioration in image quality.

Conventionally, there has been available a method comprising lossless and lossy encoding schemes as encoding schemes of compressing data to a given target amount of code, which uses the lossless encoding scheme when the target amount of code can be achieved by lossless encoding, and uses the lossy encoding scheme when the target amount of code cannot be achieved. For example, there is known a method of applying lossless encoding or lossy encoding to encoding target data after reducing its amount by, for example, decreasing the resolution to ½ when checking the compression ratio achieved by lossless encoding for each predetermined unit of encoding and determining that the target amount of code will be exceeded (for example, Japanese Patent Laid-Open No. 10-207645).

When an image is segmented into a plurality of blocks and the conventional technique is applied to each block, it is possible to control the amount og code generated for each fine unit. On the other hand, when a losslessly encoded block is adjacent to a lossily encoded block, the boundary looks unnatural and becomes noticeable.

SUMMARY OF THE INVENTION

The present inventor has found that boundary noise occurs when types of encoding are switched in a case of a pattern image having periodicity in which a pixel value representing the same color repeatedly appears every several pixels, in particular.

The present invention therefore provides a technique which suppresses mixing of different types of encoded data in an image area having a specific image property like that described above while allowing mixing of losslessly encoded data and lossily encoded data, and can also obtain a high compression ratio by performing lossy encoding with respect to an image after resolution conversion.

In order to solve this problem, for example, the present invention provides an image processing apparatus comprising:

an input unit which inputs image data;
a lossless encoding unit which losslessly encodes the input image data;
a lossy encoding unit which lossily encodes the input image data; and
a control unit which, when the image data is not a specific type of image, compares a data amount of losslessly encoded data obtained by the lossless encoding unit with a data amount of lossily encoded data obtained by the lossy encoding unit, and outputs one of the encoded data on the basis of a comparison result, and, when the image data is a specific type of image, outputs the encoded data obtained by one of the lossless encoding unit and the lossy encoding unit regardless of the comparison result.

According to the present invention, mixing of different types of encoded data is suppressed in an image area having a specific image property while mixing of losslessly encoded data and lossily encoded data is allowed, and a high compression ratio can be obtained by performing lossy encoding with respect to an image after resolution conversion.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing the positions of a pixel x of interest and surrounding pixels a, b, c, and d in encoding processing by a second encoding unit 104;

DESCRIPTION OF THE EMBODIMENTS

Embodiments of the present invention will be described below with reference to the accompanying drawings.

First Embodiment

Figure 1:
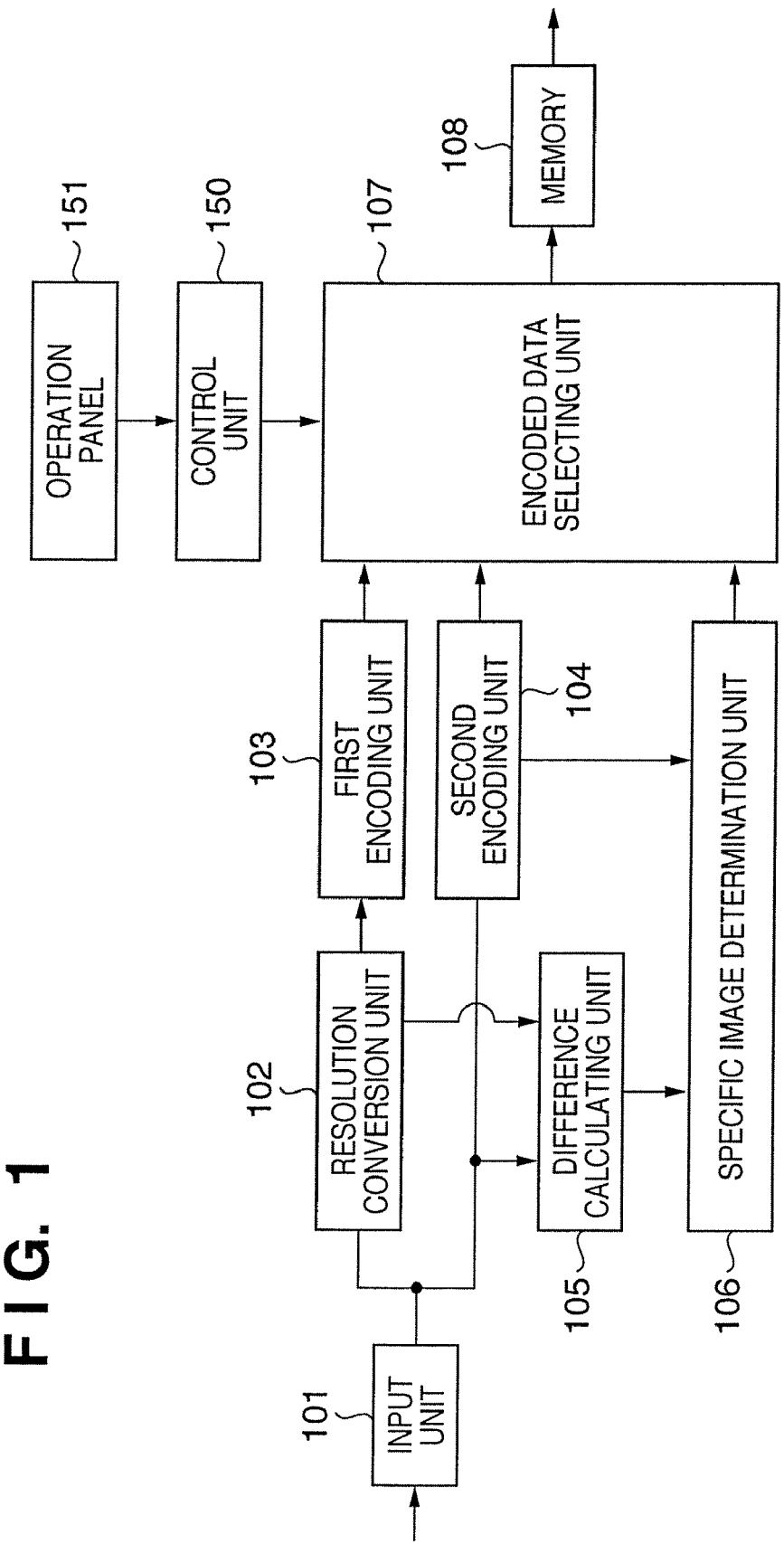
FIG. 1 is a block diagram showing the arrangement of an image processing apparatus according to the first embodiment.

FIG. 1 is a block diagram showing the arrangement of an image processing apparatus according to this embodiment. The respective units shown in FIG. 1 will be briefly described below.

The image processing apparatus according to this embodiment comprises an input unit 101 which inputs, in raster scan order, image data generated by a renderer which renders data described in the page description language and outputs the data for each block with a predetermined size. Note that an image input by the input unit 101 is not limited to a rendered image and may be an image input from an image input device such as an image scanner or an image obtained by reading an image file stored in a storage medium. In some cases, the input unit 101 may receive an image from a network. That is, there is no limitation on the image source to be used. Assume that in this embodiment, the size of each block is set to 16×16 pixels (the image data of such a block will be simply referred to as an image block hereinafter). For this reason, the input unit 101 incorporates a 16-line buffer memory.

A control unit 150 receives, from a user through an operation panel 151, instruction information indicating to which one of lossless encoding and lossy encoding the user gives priority, and sets the result in the encoded data selecting unit 107.

A resolution conversion unit 102 converts the resolution of the input image block to ½ in both the horizontal and vertical directions. In this embodiment, since the size of an image block is 16×16 pixels, the resolution conversion unit 102 generates 8×8 pixel image data from this image block. The resolution conversion unit 102 supplies the image data (8×8 pixel data) after resolution conversion to a first encoding unit 103. Assume that in resolution conversion in this embodiment, for example, the average value of four pixels, i.e., two pixels in the horizontal direction and two pixels in the vertical direction, is determined as the value of an output pixel. However, it suffices to use the nearest neighbor method of extracting one pixel from four pixels, i.e., two pixels in the horizontal direction and two pixels in the vertical direction or another known resolution conversion method.

The first encoding unit 103 lossily encodes the supplied image data. This embodiment uses the JPEG encoding scheme, which is one of the known multilevel image encoding techniques, as a lossy encoding scheme. That is, the embodiment performs orthogonal transformation processing, quantization processing using a quantization step, and Huffman encoding processing for image data corresponding to an 8×8 pixel unit. When outputting encoded data corresponding to one image block to an encoded data selecting unit 107, the first encoding unit 103 adds one-bit identification information indicating lossily encoded data to the header of the encoded data.

A second encoding unit 104 losslessly encodes the input image block to generate losslessly encoded data. The second encoding unit 104 outputs the generated losslessly encoded data to the encoded data selecting unit 107. This embodiment uses JPEG-LS, which is a known lossless encoding scheme for multilevel images, for the second encoding unit 104. However, the present invention is not limited to this, and it suffices to perform encoding processing by using PNG or JPEG2000 as long as it performs lossless encoding. When generating encoded data, the second encoding unit 104 adds one-bit identification information indicating losslessly encoded data to the header of the encoded data.

A difference calculating unit 105 computes the difference between the image data of the input image block (16×16 pixel data) and the image data (8×8 pixel data) obtained by conversion by the resolution conversion unit 102. That is, the difference calculating unit 105 calculates how much the image after resolution conversion has changed from the image before the conversion. The contents of computation by the difference calculating unit 105 will also be described in detail later.

A specific image determination unit 106 receives difference information from the difference calculating unit 105 and information from the second encoding unit, and determines whether the image block of interest has a specific image property (to be described in detail). The specific image determination unit 106 then outputs a signal representing the determination result to the encoded data selecting unit 107.

The encoded data selecting unit 107 selects one of encoded data from the first encoding unit 103 and the second encoding unit 104 on the basis of control signals from the specific image determination unit 106 and the control unit 150, and outputs the selected data to a memory 108. More specifically, the encoded data selecting unit 107 performs processing in the following manner.

1. Upon receiving a signal indicating that an image block of interest does not have any specific image property from the specific image determination unit 106, the encoded data selecting unit 107 compares the data amount (code length) of encoded data from the first encoding unit 103 with that of encoded data from the second encoding unit 104, and outputs the data with a smaller data amount to the memory 108.

2. Upon receiving a signal indicating that an image block of interest has a specific image property from the specific image determination unit 106, the encoded data selecting unit 107 selects encoded data of a type designated by the control unit 150 and outputs it to the memory 108. That is, the encoded data selecting unit 107 does not compare the amount of encoded data from the first encoding unit 103 with that from the second encoding unit 104.

In the above manner, the encoded data selecting unit 107 outputs the selected encoded data to the memory 108. It suffices to store the encoded data as a file in a storage device instead of the memory 108 or output the data onto a network.

Figure 2:
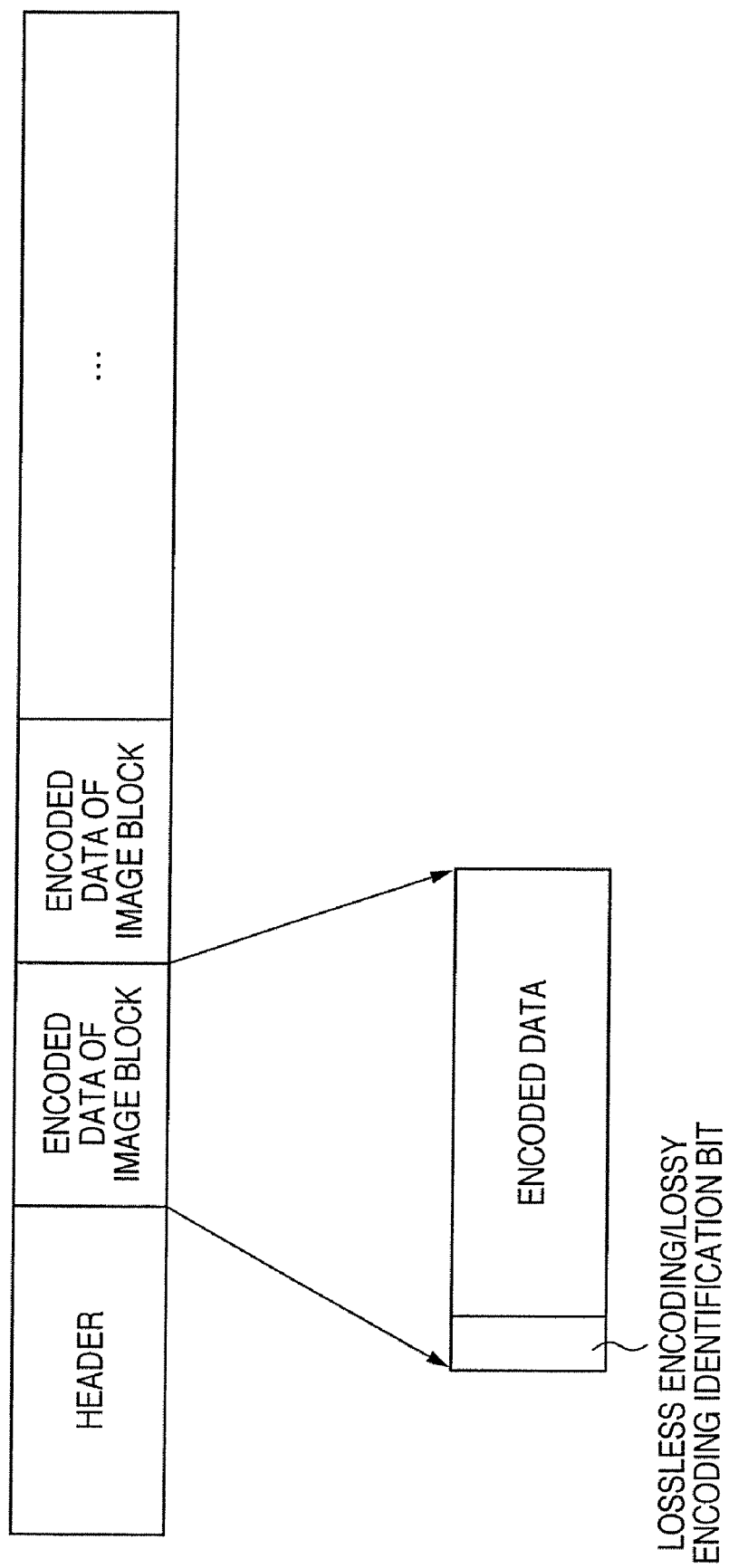
FIG. 2 is a view showing an example of the format of encoded data according to the first embodiment.

FIG. 2 shows an example of the format of image data stored in the memory 108.

A header stores information required to decode image data, e.g., the numbers of pixels of encoding target image data in the horizontal and vertical directions, the number of color components, and the number of bits of each color component. The encoded data of each image block follows this header.

Identification information (one bit) indicating lossless encoding/lossy encoding is added to the head of the encoded data of each image block. It suffices to store identification information for each image block in a header instead of adding identification information for each image block. In brief, it suffices to have information that allows decoding without any contradiction in decoding.

Figure 3:
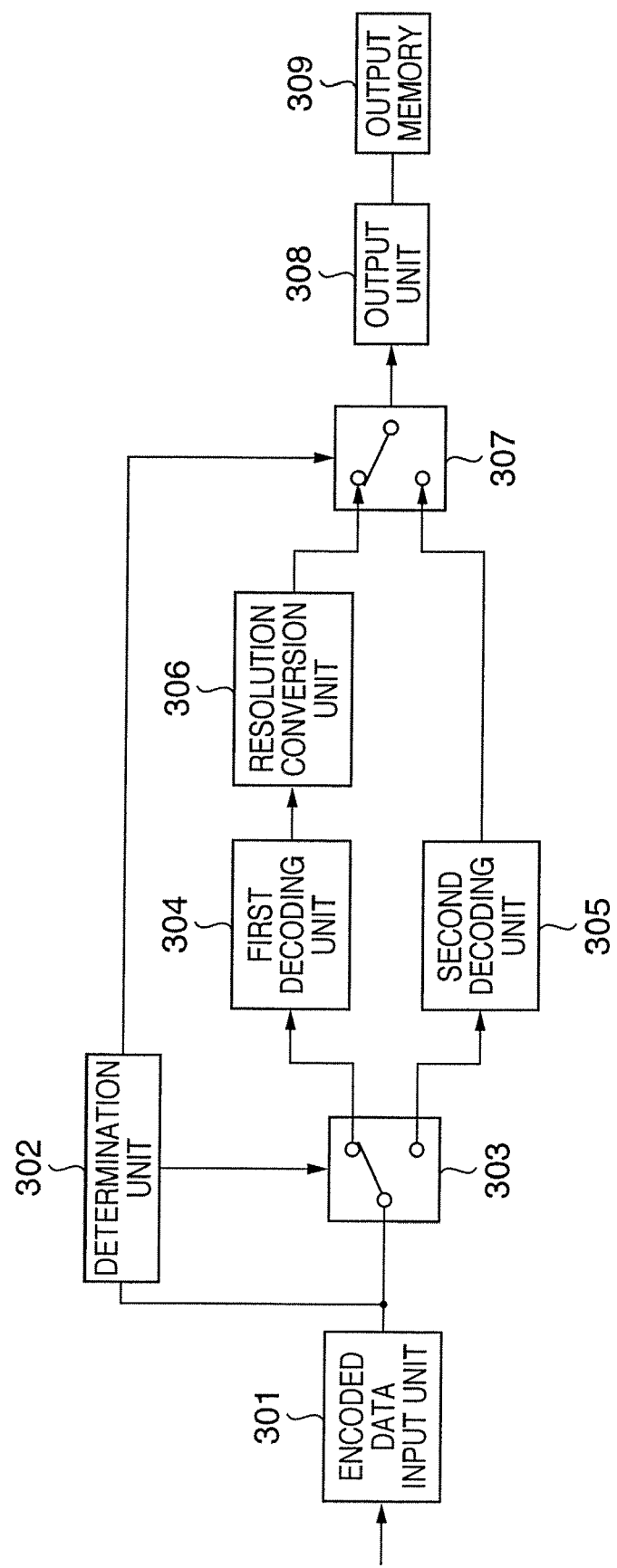
FIG. 3 is a block diagram showing the arrangement of a decoding processing apparatus according to the first embodiment.

Decoding processing in this embodiment will be described next. FIG. 3 is a block diagram showing the arrangement of a decoding apparatus according to the embodiment.

An encoded data input unit 301 inputs the encoded data of an image block obtained by encoding processing described above, and outputs the data to a determination unit 302 and a switch 303. The determination unit 302 determines identification information in the head of the encoded data, and outputs the determination result to the switch 303 and a switch 307. More specifically, the determination unit 302 determines whether the start bit of the encoded data indicates "lossless" or "lossy".

If the signal representing the determination result from the determination unit 302 indicates "lossy", the switch 303 outputs the encoded data to a first decoding unit 304. If the signal representing the determination result from the determination unit 302 indicates "lossless", the switch 303 outputs the encoded data to a second decoding unit 305. The first decoding unit 304 is designed to lossily decode encoded data, and uses the JPEG decoding scheme in this embodiment. The second decoding unit 305 uses a lossless decoding scheme (e.g., a decoding scheme using JPEG-LS, PNG, or JPEG2000).

A resolution conversion unit 306 converts 8×8 pixel image data after decoding, which is output from the first decoding unit 304, into a size of 16×16 pixels. The resolution conversion unit 306 may use, for example, a linear interpolation technique.

If the signal representing the determination result from the determination unit 302 indicates "lossless", the switch 307 selects the decoding result output from the second decoding unit 305 and outputs it to an output unit 308. If the signal representing the determination result from the determination unit 302 indicates "lossy", the switch 307 selects the image data from the resolution conversion unit 306 and outputs it to the output unit 308.

The output unit 308 receives image data on a 16×16 pixel basis from the switch 307. The output unit 308 therefore incorporates a 16-line buffer memory. When storing decoded image data corresponding to one stripe of 16 lines, the output unit 308 outputs the data to an output memory 309. In this case, the output destination is the memory 309. In the case of a storage device such as a hard disk, the above image data may be stored as a file.

The above embodiment has exemplified image encoding and decoding processing. The specific image determination unit 106 on the encoding apparatus side in the embodiment will be described next.

The specific image determination unit 106 determines on the basis of information from the difference calculating unit 105 and second encoding unit 104 whether an image block of interest has a specific image property, and outputs the determination result to the encoded data selecting unit 107.

Figure 4:
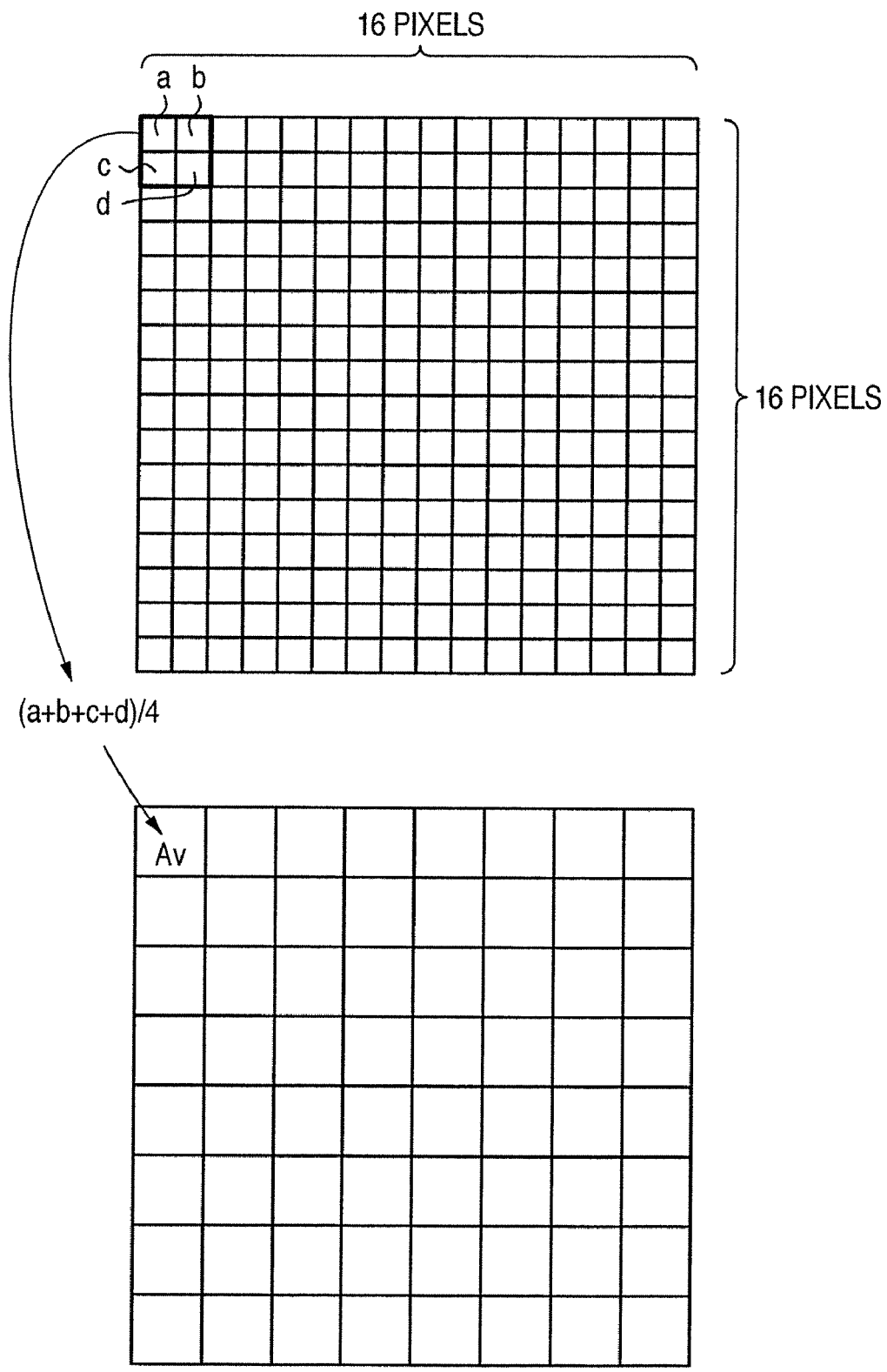
FIG. 4 is a view for explaining the operation of a resolution conversion unit 102 in this embodiment.

Information from the difference calculating unit 105 will be described first. As described above, the resolution conversion unit 102 converts 16×16 pixel data into 8×8 pixel data. As shown in FIG. 4, the resolution conversion unit 102 calculates the average value of 2×2 pixels in the input 16×16 pixel image block to obtain the value of one pixel after resolution conversion. Letting V( ) be the value of each of 16×16 pixels before conversion and Vave( ) be the value of each of 8×8 pixels after conversion, Vave( ) after conversion can be represented by $$Vave(x,y)=\{V(2x,2y)+V(2x+1,2y)+V(2x,2y+1)+V(2x+1,2y+1)\}/4 \quad (1)$$

where x and y respectively represent horizontal and vertical coordinates, both of which have values i and j=0, 2, . . . , 7.

A difference (difference after resolution conversion) D between an image after conversion and an image before conversion can be given by equation (2):

$$D=\Sigma|Vave(x,y)-V(2x,2y)|+|Vave(x,y)-V(2x+1,2y)|+|Vave(x,y)-V(2x,2y+1)|+|Vave(x,y)-V(2x+1,2y+1)| \quad (2)$$

where $\Sigma$ is a summation function of x, y=0, 1, . . . , 7. Note that each color component of image data is to be obtained. In practice, therefore, equation (2) is calculated for each color component, and a total value Dt of differences for the respective color components is obtained. If a color image is an RGB image and errors concerning the respective color components are represented by Dr, Db, and Dg, an error Dt between images before and after conversion in consideration of the color components is represented by Dt=Dr+Db+Dg. The difference calculating unit 105 outputs the error Dt to the specific image determination unit 106.

Consider the meaning of the total value Dt. In a case of a natural image such as a scenery image, since the colors of adjacent pixels (i.e., the values of the color components of adjacent pixels are likely to be identical or similar, the value D of equation (2) becomes a small value. Inevitably, the value Dt also becomes a small value. In a case of an image containing many high-frequency components, e.g., a character-line image, since the value D becomes a large value, the value Dt also becomes a large value. That is, the value Dt is an index indicating how much the image after resolution conversion differs from the original image block. For this reason, the value Dt will be referred to as a resolution conversion error hereinafter.

Information which the specific image determination unit 106 receives from the second encoding unit 104 will be described next.

The second encoding unit 104 in the embodiment exemplifies JPEG-LS as lossless encoding. In JPEG-LS, the second encoding unit 104 refers to four pixels Xa, Xb, Xc, and Xd (the positions of already encoded pixels) surrounding a pixel X of interest, and starts run length encoding if the four surrounding pixels Xa, Xb, Xc, and Xd have the same color. Otherwise, the second encoding unit 104 performs predictive encoding. Assume that four surrounding pixels have the same color. In this case, during the execution of run length encoding, the end of run length encoding is determined when the pixel X of interest differs in color from the immediately preceding pixel (the pixel Xa in FIG. 6) or the pixel X of interest reaches the end of one line.

As described above, the second encoding unit 104 performs either run length encoding or predictive encoding by referring to the values of the four surrounding pixels Xa, Xb, Xc, and Xd while sequentially updating the position of the pixel X of interest during encoding of an image block of interest.

The specific image determination unit 106 in this embodiment then receives the values of four pixels surrounding the pixel X of interest, to which the second encoding unit 104 refers during encoding processing, and information indicating whether run length encoding or predictive encoding is being performed, and obtains a run ratio Rr and a two-color ratio Cr.

The run ratio Rr is the ratio of the number of pixels subjected to run length encoding to the total number of pixels of an image block of interest (256 pixels because the image block comprises 16×16 pixels in the embodiment). If the number of pixels subjected to run length encoding is 50, run ratio Rr=$\{50/256\} \times 100=19.53 \approx 20\%$.

The two-color ratio Cr is calculated as follows.

Figure 5:
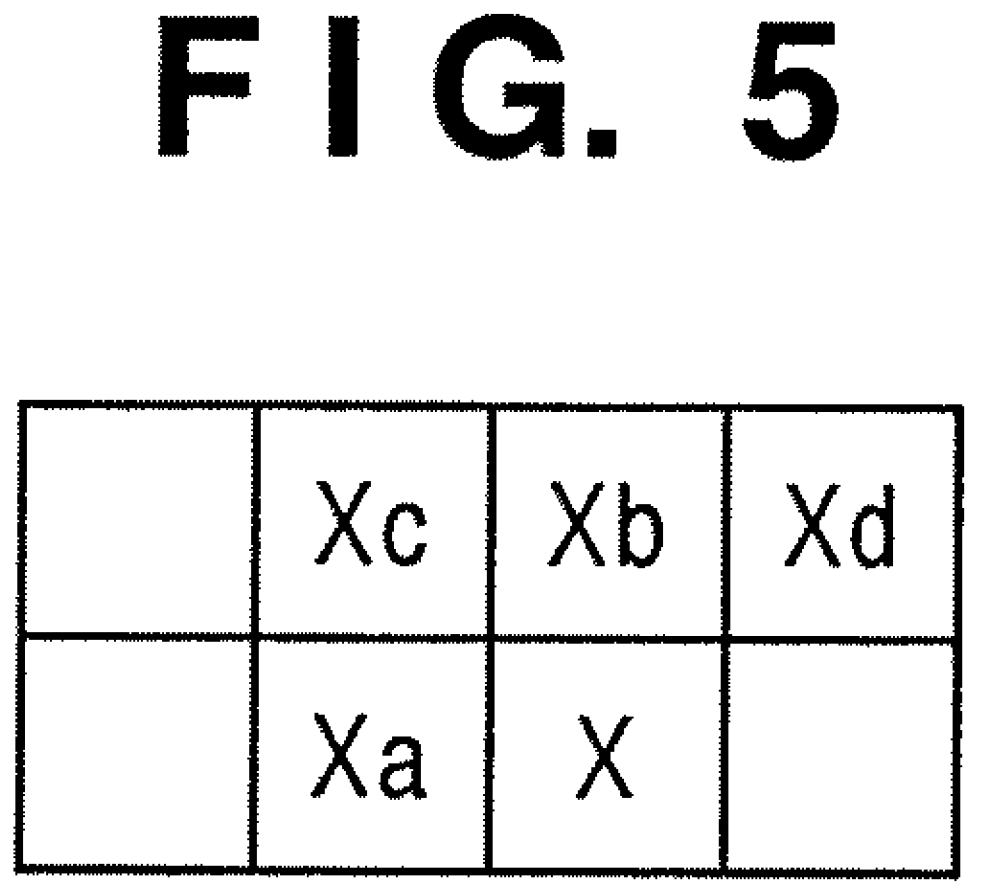

The specific image determination unit 106 refers to the pixels Xa, Xb, Xc, and Xd surrounding the pixel x of interest in the window shown in FIG. 5, and obtains difference values Dab, Dac, Dad, Dbc, and Dcd between the surrounding pixels according to equations (3) given below:

$$Dab=Xa-Xb$$

$$Dac=Xa-Xc$$

$$Dad=Xa-Xd$$

$$Dbc=Xb-Xc$$

$$Dbd=Xb-Xd$$

$$Dcd=Xc-Xd \quad (3)$$

The specific image determination unit 106 then counts the number (F) of times the difference values Dab, Dac, Dad, Dbc, Dbd, and Dcd become 0 (two pixels have the same color). Since there are six difference values, the value F can take zero to six. In this case, F=0 obviously indicates that all the surrounding pixels Xa, Xb, Xc, and Xd have different colors, and hence the number of colors is four. F=1 indicates that two pixels of the four surrounding pixels have the same color, and the number of colors represented by the surrounding pixels Xa, Xb, Xc, and Xd is three. Likewise, F=2 or F=3 indicates that the number of colors is two. F=4 or more (in practice, this number does not become 4 or 5, and F=6) indicates that all the surrounding pixels Xa, Xb, Xc, and Xd have the same color (one color).

As shown in FIG. 4, the pixel X of interest is raster-scanned from the upper left position of input 16×16 pixels, and hence the specific image determination unit 106 computes equations (3) a total of 16×16=256 times. The specific image determination unit 106 counts the number of times F=2 (the number of colors represented by four surrounding pixels is two) holds by 256 times of computations. Letting C be the counted number, the two-color ratio Cr is given below $$Cr=\{C/256\}\times 100$$

Note that when the pixel X of interest is located at a boundary of a 16×16 pixel block, some of four surrounding pixels to be referred to are located outside the boundary. The above counting operation is performed while the color components of the respective pixels outside the boundary are regarded as "0".

In this case, a large value of the two-color ratio Cr indicates that the image block of interest is likely to be an image represented by two colors. Typically, this image is an image in which black characters are present on a white ground (background) like a document on which a general text is written.

The specific image determination unit 106 then determines, on the basis of the resolution conversion error Dt, run ratio Rr, and two-color ratio Cr calculated in the above manner, whether the following condition holds:

determination condition: $Dt \geqq Th1$, $Rr \leqq Th2$, and $Cr \geqq Th3$.

If the above determination condition holds, the specific image determination unit 106 determines that the image of the image block of interest belongs to a specific image, and outputs the determination result to the encoded data selecting unit 107. If the condition does not hold, the specific image determination unit 106 outputs a signal indicating that the image does not belong to the specific image to the encoded data selecting unit 107.

Consider an image which satisfies the above condition. When an image satisfies the above condition, the difference (resolution conversion error) between an image block of interest before resolution conversion and that after the resolution conversion is large, the pixels have almost two colors, and pixels with the same color are not continuously generated.

Figure 6:
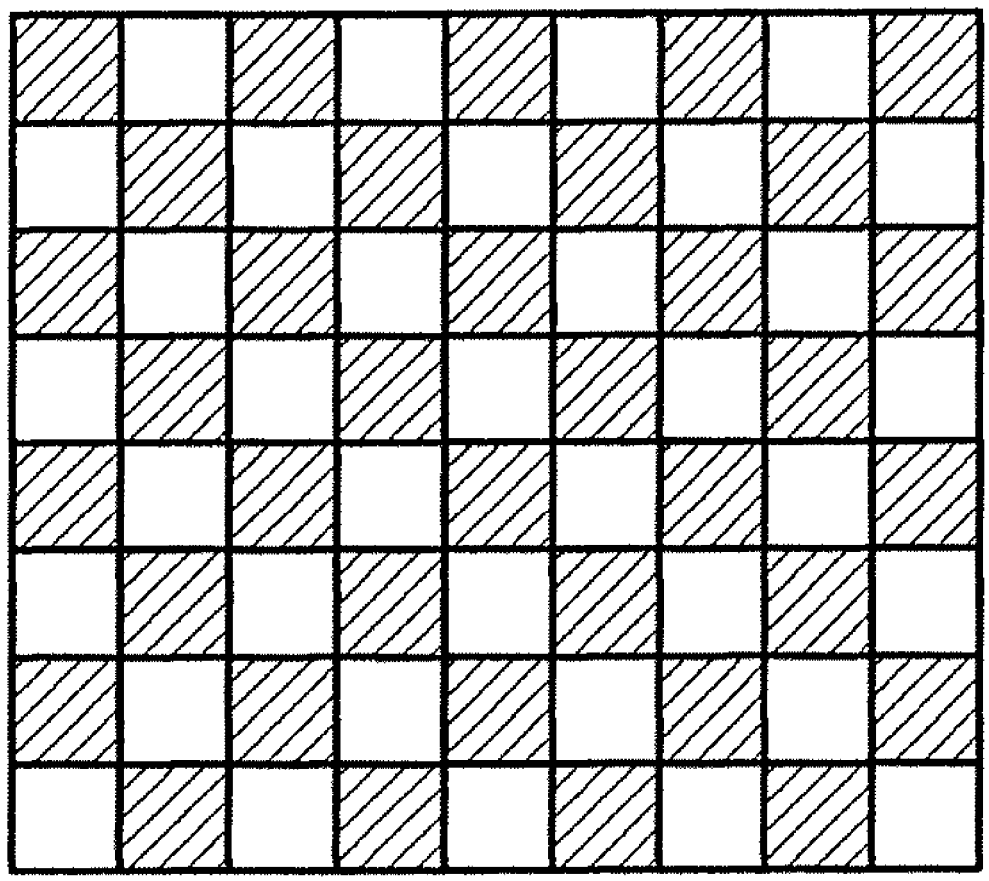
FIG. 6 is a view showing an example of a specific image.

FIG. 6 shows an example of a typical specific image which satisfies the above determination condition. For example, in the image shown in FIG. 6, the difference value Dt calculated by the difference calculating unit 105 is a large value. This is because, assuming that a black pixel has R=G=B=0 and a white pixel has R=G=B=255, a pixel obtained from 2×2 pixels after resolution conversion has the value "128", and the error D represented by equation (2) exceeds "500". In addition, in the image in FIG. 6, adjacent pixels have different colors, and hence the run ratio Rr is "0", and the two-color ratio Cr has a large value.

As described above, according to this embodiment, an image block (16×16 pixels in the embodiment) is losslessly encoded, and the image block after resolution conversion is lossily encoded. One of the above images which has a smaller code amount is selected and output. This makes it possible to expect a high compression ratio. In addition, in an image area belonging to a specific image (halftone dot image or the like), since losslessly encoded data and lossily encoded data do not simultaneously exist, the occurrence of noise at the boundaries between image blocks can be suppressed.

The embodiment has exemplified the case wherein the specific image determination unit 106 determines whether an image block of interest is a specific image, by determining whether determination condition: $Dt \geqq Th1$, $Rr \leqq Th2$, and $Cr \geqq Th3$ holds. However, it suffices to determine that an image block of interest is a specific image, when at least one of the three determination requirements is satisfied. In particular, the determination requirement "$Dt \geqq Th1$" is a value indicating a resolution conversion error itself, and hence performing determination according to this requirement alone makes it possible to expect an effect similar to the above function and effect. In addition, the user may set the thresholds Th1, Th2, and Th3 with the operation panel 151 as needed.

Modification of First Embodiment

The first embodiment has been described on the basis of the arrangements shown in FIGS. 1 and 3, but equivalent processing can be implemented by software. An example of this will be described below.

Figure 7:
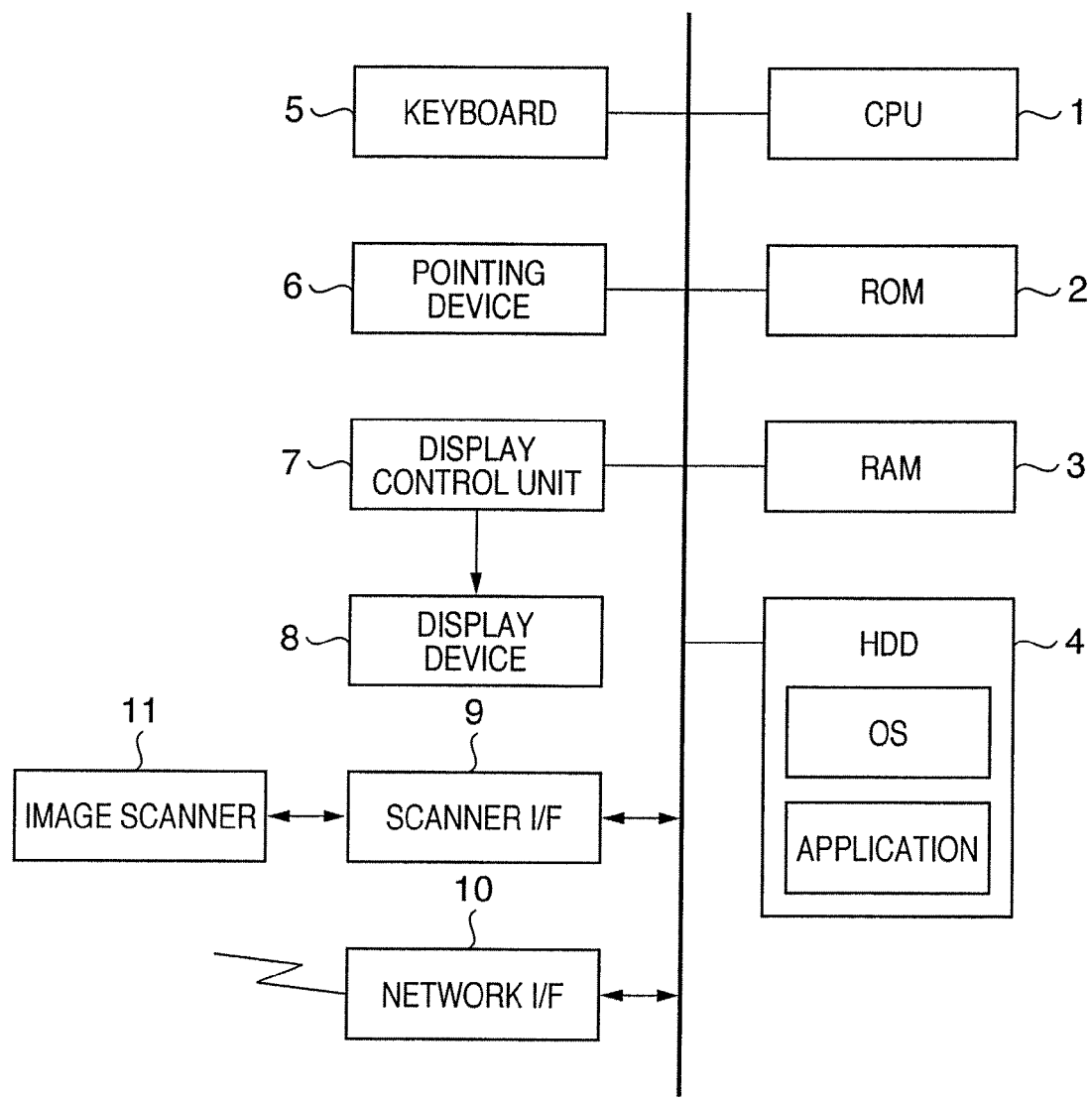
FIG. 7 is a block diagram showing the arrangement of a computer according to a modification of the first embodiment.

FIG. 7 is a block diagram showing the arrangement of an information processing apparatus such as a personal computer. Referring to FIG. 7, reference numeral 1 denotes a CPU which controls the overall apparatus; 2, a ROM storing a BIOS and a boot program; 3, a RAM which is used as a work area for the CPU 1; 4, a hard disk drive (HDD) which stores an OS (Operating System) and application programs associated with image encoding processing/decoding processing; 5, a keyboard; 6, a pointing device such as a mouse; and 7, a display control unit which incorporates a video memory for rendering an image to be displayed and a video controller which renders an image in the video memory under the control of the CPU 1, reads an image from the video memory, and outputs the image as a video signal to a display device 8. The display device 8 is a CRT or liquid crystal display device. Reference numeral 9 denotes a scanner interface for connecting an image scanner 11, which is typified by a SCSI interface or USB interface; and 10, a network interface.

In the above arrangement, when the user turns on the power supply of this apparatus, the CPU 1 loads the OS from the HDD 4 into the RAM 3 in accordance with the boot program in the ROM 2. As a result, the apparatus performs the processing of inputting information from the user through the keyboard 5 or mouse 6 and rendering a GUI with respect to the control unit 7, thereby functioning as an interactive apparatus. When the user issues an instruction to activate an application, the application is loaded from the HDD 4 into the RAM 3 and executed by the CPU 1. As a consequence, this apparatus functions as an image encoding apparatus (or an image decoding apparatus).

Image encoding processing and image decoding processing have a reversible relationship. A processing procedure by the CPU 1 in a case wherein an application is executed, and the user inputs an instruction to encode an image on the application will be described with reference to the flowcharts of FIGS. 8 and 9. Since decoding processing can be easily understood from the described contents of the first embodiment and the following description, a repetitive description will be omitted.

Before the following description, assume that the RAM 3 holds a buffer memory which temporarily stores image data read by the image scanner 11.

In step S1, the CPU 1 displays a menu for selecting whether to give priority to lossless encoding or lossy encoding, thereby causing the user to select either of them. In addition, at this time, a paper size and a read resolution at the time of reading operation are also set. Setting a paper size and read resolution will determine the numbers of pixels of image data as an encoding target in the horizontal and vertical directions. Consequently, the number of image blocks is uniquely determined.

In step S2, the CPU 1 receives image data (the image data of 16×16 pixels in the embodiment) corresponding to one image block in the image read by the image scanner from the buffer memory in the RAM 3. In step S3, the CPU 1 performs resolution conversion. That is, the CPU 1 converts the data of 16×16 pixel image into 8×8 pixel image data. In step S4, the CPU 1 lossily encodes (JPEG-encodes in this embodiment) the image data after resolution conversion, thereby generating lossily encoded data.

In step S5, the CPU 1 calculates the resolution conversion error Dt on the basis of the image data (8×8 pixels) after resolution conversion and the image data (16×16 pixels) of the image block before resolution conversion. Note that it suffices to reverse the order of steps S4 and S5.

In step S6, the CPU 1 performs lossless encoding processing (JPEG-LS in the embodiment) for the input image block. In step S7, the CPU 1 extracts the data of pixels surrounding a pixel of interest, which are referred to during lossless encoding processing, and information indicating whether predictive encoding or run length encoding is being performed, and performs preliminary processing for obtaining the two-color ratio Cr and run ratio Rr described above.

In step S8, the CPU 1 determines whether lossless encoding of one image block is complete (a pixel as lossless encoding target is located at the lower right corner of one block). If NO in step S8, the CPU 1 repeats the processing in step S6 and subsequent steps.

When lossless encoding of one block is complete, the process advances to step S9 to calculate the run ratio Rr and the two-color ratio Cr. The process then advances to step S10.

In step S10, the CPU 1 determines whether the resolution conversion error Dt, run ratio Rr, and two-color ratio Cr obtained in the above manner satisfy the above determination condition. That is, the CPU 1 determines whether the image block of interest has a specific image property.

If the CPU 1 determines in step S10 that the image block of interest has a specific image property, the process advances to step S11 to output the encoded data of the type which has been preferentially designated. The process then advances to step S15.

If the CPU 1 determines in step S10 that the image block of interest does not have a specific image property, the process advances to step S12 to compare the code amount (code length) of the losslessly encoded data with that of the lossily encoded data. The process advances to step S13 or S14 to output encoded data with a smaller code amount. The process then advances to step S15.

In step S15, the CPU 1 determines whether encoding processing for all image blocks is complete.

If NO in step S15, the CPU 1 repeats the processing in step S2 and subsequent steps. If YES in step S15, the CPU 1 terminates the above series of encoding processing.

As has been described above, processing equivalent to that in the first embodiment can also be implemented by computer programs.

Figure 8:
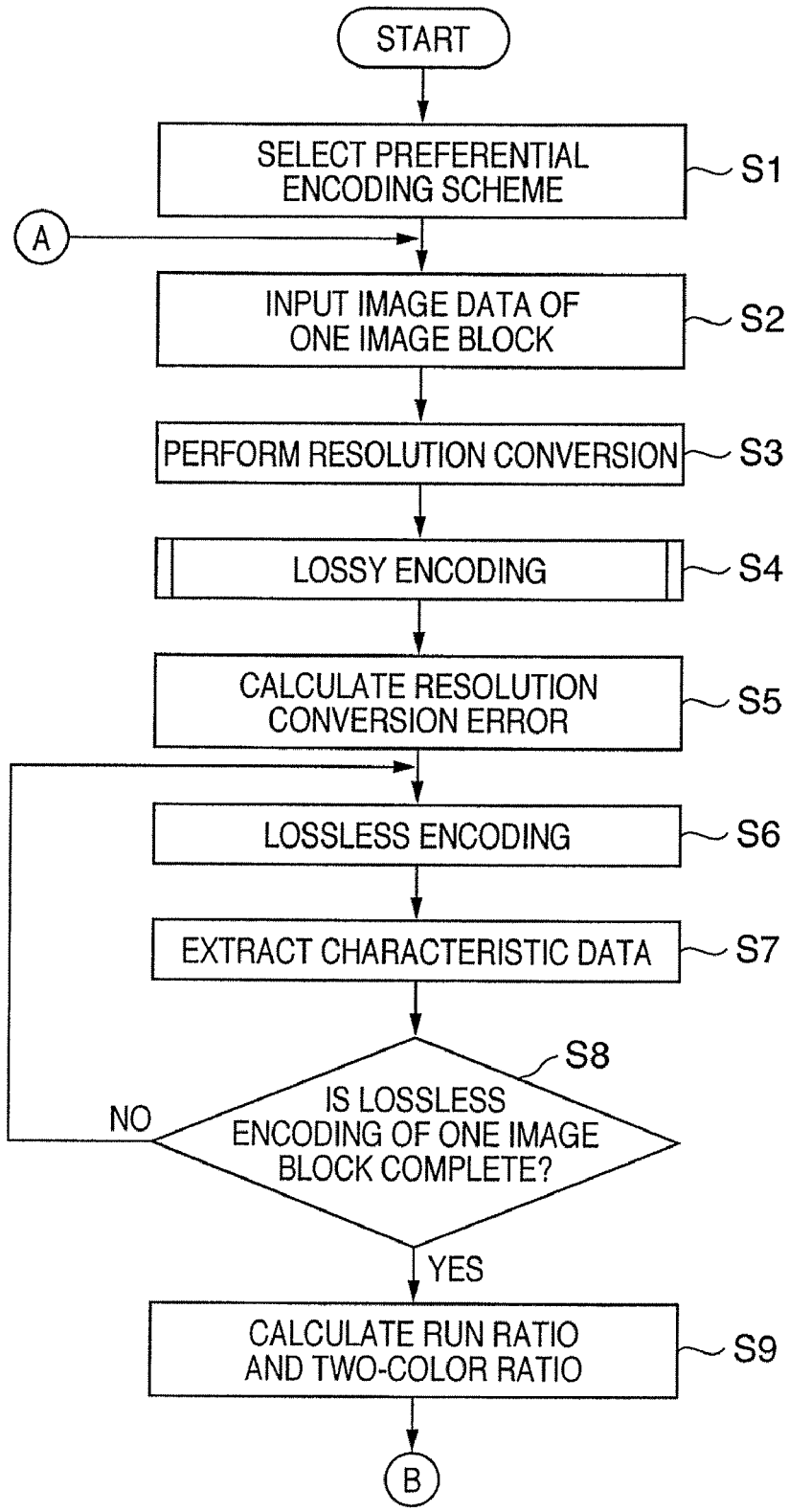
FIG. 8 is a flowchart showing a processing procedure in the computer.
Figure 9:
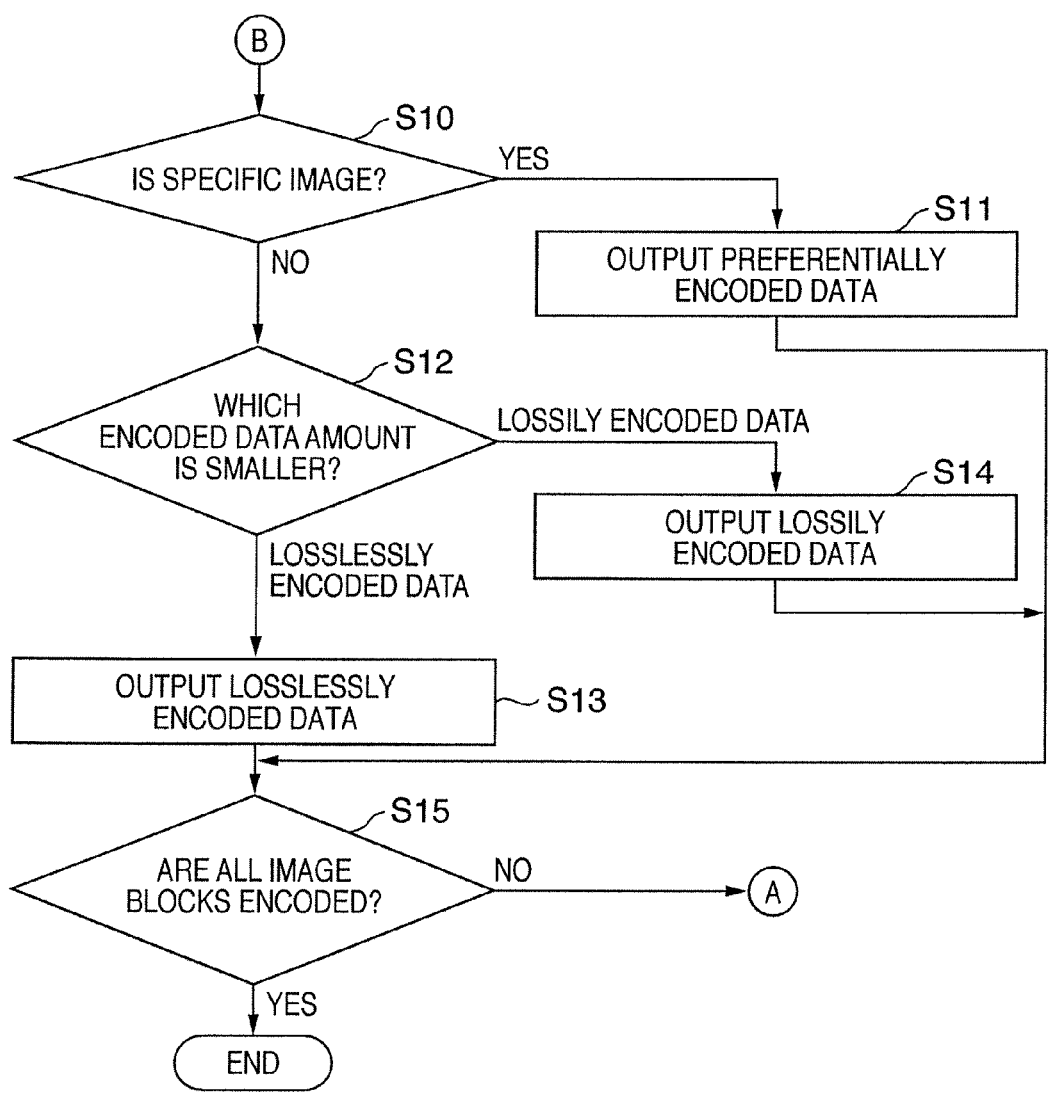
FIG. 9 is a flowchart showing a processing procedure in the computer.

According to the flowcharts of FIGS. 8 and 9, image data as an encoding target is input from the image scanner. However, target image data for encoding may be a file.

In addition, in general, a computer program is stored in a computer-readable storage medium such as a CD-ROM. Such a program is set in the reader (a CD-ROM drive or the like) of the computer and is copied or installed in the system, thereby allowing the program to be implemented. Obviously, therefore, the present invention incorporates such a computer-readable storage medium.

The embodiment according to the present invention has been described above. However, the present invention is not limited to the embodiment described above. For example, in the embodiment, the size of an image block as an encoding unit is set to a 16×16 pixel size. This is because the first encoding unit which performs lossy encoding in the embodiment uses JPEG (in general, JPEG performs DCT for each 8×8 pixel size). However, this size can be increased to 8n×8m pixel size (where n and m are integers equal to or more than 1).

In addition, the types of lossy encoding and lossless encoding are not limited to those in the above embodiment. It suffices to use any type of scheme. In addition, the user may set thresholds for determining the magnitude of resolution as needed.

Second Embodiment

Figure 10:
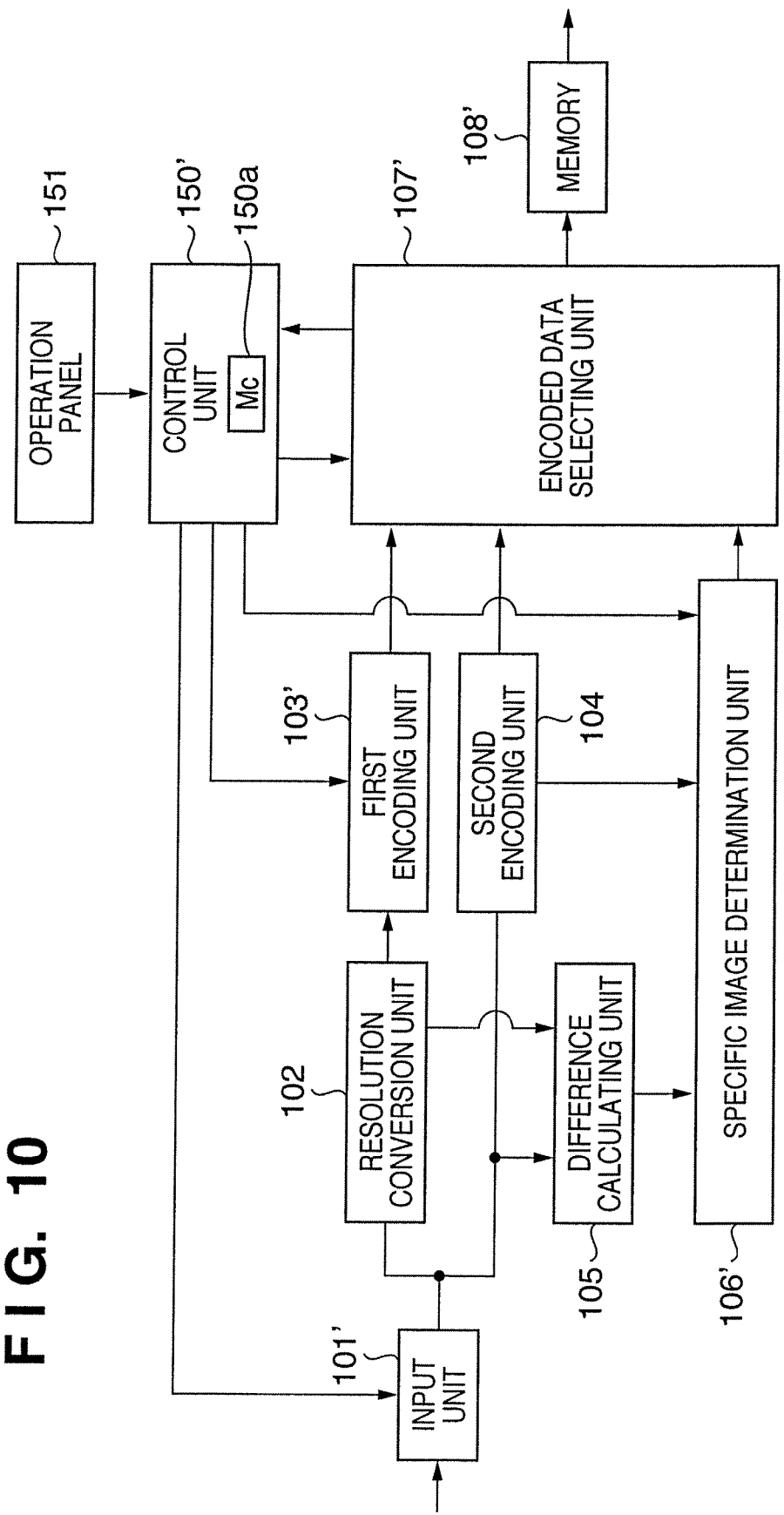
FIG. 10 is a block diagram showing the arrangement of an image processing apparatus according to the second embodiment.

FIG. 10 is a block diagram showing the arrangement of an image processing apparatus according to the second embodiment. The same reference numerals as in FIG. 10 denote elements having the same functions in FIG. 1. Assume that a memory 108' has a sufficient capacity for the storage of one-page encoded data. In addition, an input unit 101' performs re-input operation from the start of one page in response to an instruction signal from a control unit 150' even in the middle of encoding processing of one page.

The input unit 101' in the second embodiment will be described as a unit which inputs image data from a renderer which generates an output image in accordance with print data or the description of a document file.

When outputting the encoded data of an image block to the memory 108', an encoded data selecting unit 1071 notifies the control unit 150' of information indicating the code amount of the encoded data.

A first encoding unit 103' performs lossy encoding in accordance with the encoding parameters supplied from the control unit 150'. The first encoding unit 103' performs JPEG encoding as in the first embodiment. Note, however, that the first encoding unit 103' in the second embodiment performs entropy encoding by quantizing DCT coefficients in accordance with the quantization step value designated by the control unit 150'. As is known by those skilled in the art, increasing the quantization step value will reduce data after quantization and increases the compression ratio. Therefore, the quantization step value set by the control unit 150' can also be regarded as an encoding parameter which determines the compression ratio of lossily encoded data.

In addition, a specific image determination unit 1061 changes the determination condition for determining whether a given image is a specific image, in accordance with a request from the control unit 150'.

In the second embodiment, the above arrangement is designed to set the encoded data amount of one page finally output to the memory 108' to be equal to or less than a threshold Mmax set in advance. Assume that the user sets the threshold Mmax with an operation panel 151, as needed.

The control unit 150' of the image processing apparatus in the second embodiment performs the following control.

When starting encoding, the control unit 150' sets an initial quantization step value Q0 in the first encoding unit 103'. The control unit 150' then instructs the input unit 101' to input image data, and starts encoding processing in this apparatus.

As quantization step values, values Q0, Q1, Q2, . . . are prepared in advance, and the relationship in magnitude between the quantization step values is represented by Q0<Q1<Q2, . . . .

The control unit 150' has a register Mc 150a for storing a code amount stored in the memory 108 during encoding processing. When starting encoding of one page, the control unit 150' zero-clears the register Mc 150a. Every time receiving a value indicating the code amount of one image block from the encoded data selecting unit 107', the control unit 150' adds the code amount to the register Mc. With this operation, the control unit 150' monitors the code amount stored in the memory 108. If Mc≦Mmax even after the completion of encoding of one page, the control unit 150' outputs the encoded data stored in the memory 108 to an external device (e.g., a hard disk). That is, in this case, the operation is the same as that in the first embodiment.

Every time detecting "Mc>Mmax" during encoding processing of one page, the control unit 150' performs the following processing:
1. discarding the encoded data stored in the memory 108' (it suffices to return the address at which the encoded data is stored to the initial position), and zero-clearing the code amount Mc held by the control unit 150';
2. forcibly setting "lossily encoded data" as preferential encoded data in the encoded data selecting unit 107';
3. updating a quantization step $Q_{i1}$ if a quantization step value $Q_i$ is currently set in the first encoding unit 103', i.e., increasing the compression ratio with respect to the first encoding unit 103';
4. changing the determination condition for a specific image in the specific image determination unit 106 or adjusting each threshold; and
5. instructing the input unit 101' to input image data as an encoding target from the start image block.

If the control unit 150' determines as a result of the above processing that an image block of interest has a specific image property in the second and subsequent encoding steps, the encoded data selecting unit 107' forcibly selects lossily encoded data. If the control unit 150' determines that the image block of interest does have a specific image property, the encoded data selecting unit 107' selects one of the lossily encoded data and losslessly encoded data which is smaller in code amount. In either of the cases, since the lossily encoded data is encoded by using a quantization step value larger than the quantization step value used in the previous encoding step, the code amount of one page can be finally set to be equal to or smaller than the threshold Mmax.

Figure 11:
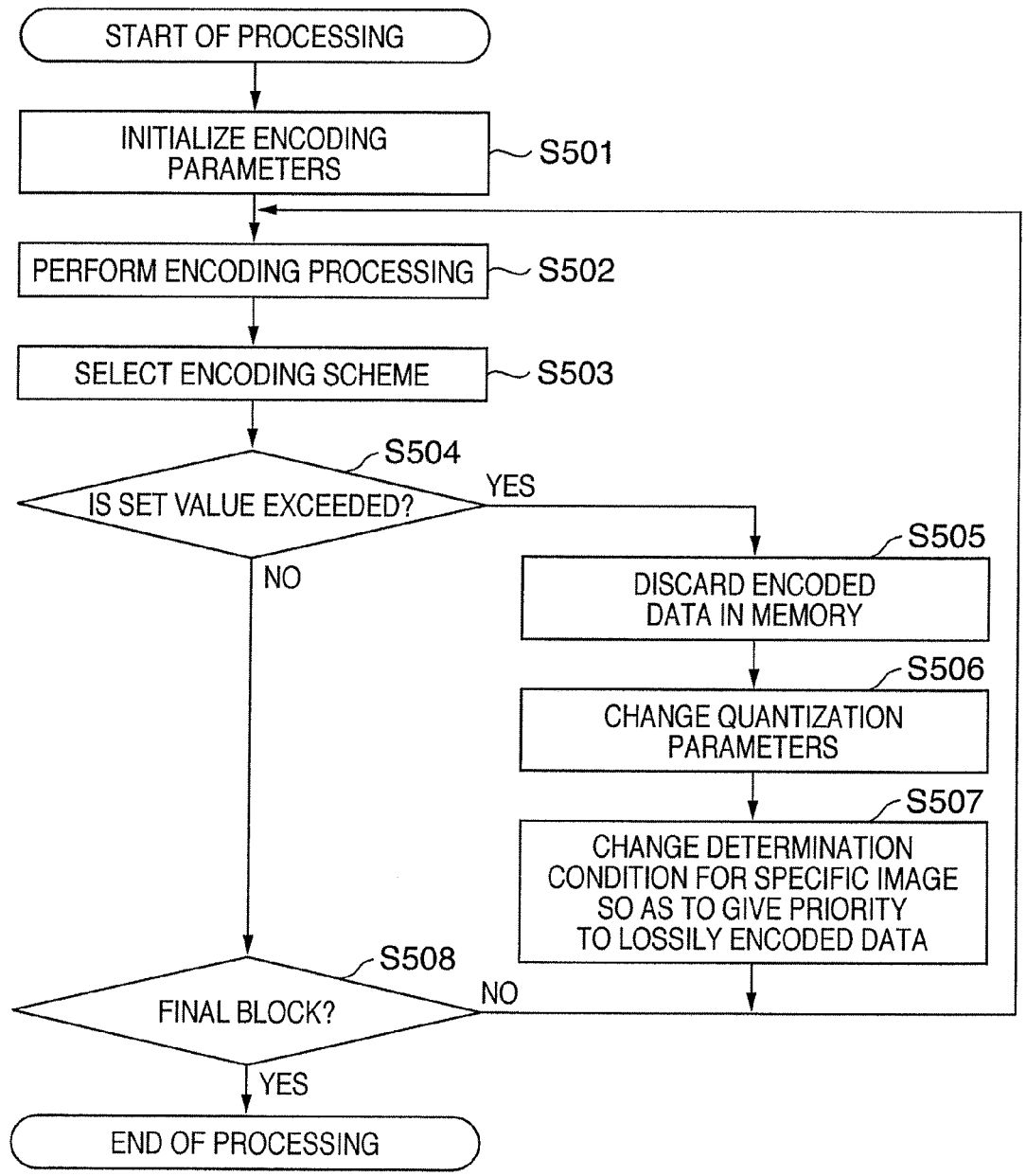
FIG. 11 is a flowchart showing a processing procedure in the second embodiment.

FIG. 11 is a flowchart showing a processing procedure in the control unit 150' in the second embodiment. This procedure will be described below with reference to the FIG. 11.

First of all, in step S501, the control unit 150' initializes encoding parameters. In this case, the control unit 150' sets, in the encoded data selecting unit 107', information indicating that the user gives priority to one of lossless encoding and lossy encoding, sets the initial quantization step value Q0 in the first encoding unit 103', and sets initial thresholds for a determination condition for a specific image in the specific image determination unit 106'. The control unit 150' also sets an upper limit value Mmax of a code amount, and zero-clears the register Mc 150a.

In step S502, the control unit 150' performs lossless encoding and lossy encoding. At this time, as in the first embodiment, the control unit 150' calculates a resolution conversion error Dt, run ratio Rr, and two-color ratio Cr. In step S503, the control unit 150' determines on the basis of resolution conversion error Dt, run ratio Rr, and two-color ratio Cr whether the image of interest is a specific image. The control unit 150' then selects one of the encoded data in accordance with the determination result, and outputs the selected data to the memory 108'.

In step S504, the control unit 150' adds the code amount of the encoded data selected by the encoded data selecting unit 107' to the register Mc 150a and determines whether Mc≦Mmax. If the control unit 150' determines that Mc≦Mmax, the process advances to step S508 to determine whether encoding processing for the last image block is complete. If NO in step S508, the control unit 150' repeats the processing in step S502 and subsequent steps.

If the control unit 150' determines in step S504, during encoding processing of one page, that Mc>Mmax, the process advances to step S505 to discard the data in the memory 108'. In step S506, the control unit 150' sets a quantization step value larger than the quantization step value set in the first encoding unit 103' by one step. In step S507, the control unit 150' forcibly sets the lossily encoded data as encoded data to which priority is given, and changes the determination condition for a specific image with respect to the specific image determination unit 106'. Note that at this time, the control unit 150' zero-clears the register Mc.

The process then returns to step S502. Note that at this time, the control unit 150' makes setting to cause the input unit 101' to resume inputting image data from the start image block of one page.

A method of changing the determination condition for a specific image in the specific image determination unit 106' in step S507 will be described.

In a document file generated by some application (e.g., PowerPoint (registered trademark) available from Microsoft, U.S.A.), transparencies are described with respect to a background image and a foreground image. When such an image is rendered in the manner designated, a change in color is small even if subsampling or resolution conversion is performed. In addition, even if losslessly encoded data and lossily encoded data are simultaneously present, a deterioration in image quality does not relatively easily occur at the boundaries between the blocks. That a change in color is small is equivalent to that the difference value (resolution conversion error) calculated by a difference calculating unit 105 is very small. For this reason, if the difference value Dt is equal to or smaller than a threshold Th4 which is sufficiently smaller than the threshold Th1 in the above embodiment, it should not be determined that the image of interest is a specific image area, regardless of the two-color ratio Cr and the run ratio Rr. For example, it suffices to determine that even an image in which pixels alternately have pixel values as shown in FIG. 6 and the two-color ratio Cr and run ratio Rr are 100% and 0%, respectively, which is generally determined as a specific image area, is not a specific image, if the difference value D is equal to or less than Th4, because a change in color is not noticeable. Changing the determination condition in step S507 will increase the probability of determining that a given image is not a specific image and increase the probability of selection by comparison between code amounts.

Third Embodiment

Assume that in the third embodiment, the upper limit value of the amount of image data after compression is determined as in the second embodiment.

An image processing apparatus characterized by performing code amount control by changing the determination condition for a specific image area if the code amount of image data exceeds the upper limit value will be described.

For example, some type of application (typically, Office 2003 PowerPoint (registered trademark) available from Microsoft, U.S.A.) allows to select a transparency at the time of execution of semitransparency processing. Assume that the transparency is high. In this case, even if a halftone dot pattern is overlaid on a given image, a background image can be clearly seen. Assume that the transparency is low. In this case, when a halftone dot pattern is overlaid on a given image, since a background image portion is not emphasized much, a large change in image quality does not occur even if subsampling or resolution conversion is performed before JPEG encoding. Even if, therefore, data based on different encoding schemes are simultaneously present in a halftone dot portion, a deterioration in image quality is not noticeable. If the transparency is low, the run ratio is very low and becomes very close to 0%. As the transparency increases, the run ratio increases. For this characteristic, even if the two-color ratio Cr and the difference value Dt are values that make the image be determined as a specific image, controlling the threshold for the run ratio Rr makes it possible to inhibit an image with a low transparence from being detected as a specific image and to reduce an area to which the JPEG-LS encoding scheme is to be applied, thereby controlling the code amount.

Figure 12A:
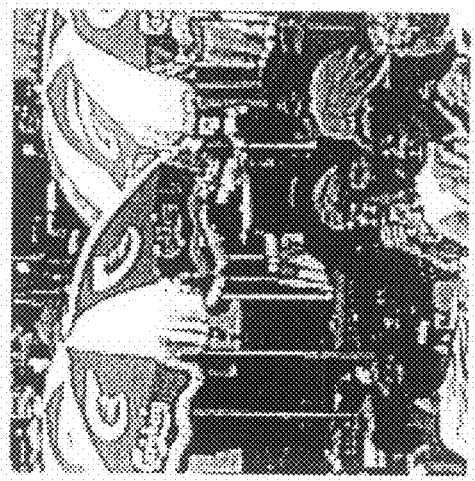
FIGS. 12A to 12C are views showing image examples for explaining the effects of encoding processing in the third embodiment.
Figure 12B:
Figure 12C:
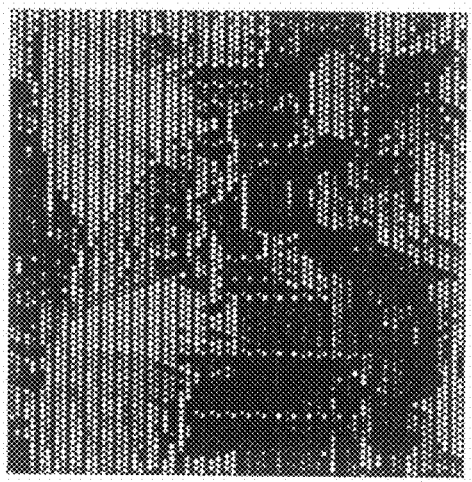

This operation will be described more specifically with reference to FIGS. 12A to 12C. FIG. 12A shows an original image. FIG. 12B shows an image obtained by overlaying a halftone dot pattern with a transparence of 50% on the image in FIG. 12A. FIG. 12C shows an image obtained by overlaying a halftone dot pattern with a transparence of 20% on the image in FIG. 12A. In this case, the run ratio of the image in FIG. 12B is 0%, and the run ratio of the image in FIG. 12C is 20%. Assume that specific image determination is performed while it is determined that a transparence of 20% or less makes a deterioration in image quality unnoticeable. In this case, the threshold for a run ratio is set to 20%, and an image with a run ratio equal to or more than 20% is not determined as a specific image area.

With the above operation, the simple method of only changing the threshold for one or more parameters for the general determination condition for a specific image can perform code amount control while suppressing a deterioration in image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-216258, filed Aug. 8, 2006, which is hereby incorporated by reference herein in its entirety.

What is claimed is:

1. An image processing apparatus which encodes image data, the apparatus comprising:
at least one processor configured to perform as:
an input unit which inputs image data as an encoding target on an image block basis;
a lossless encoding unit which generates lossless encoded data by losslessly encoding image data of an image block input by said input unit;
a resolution conversion unit which converts the image data of the image block input by said input unit into image data with a resolution lower than a resolution of the image block;
a lossy encoding unit which generates lossy encoded data by lossily encoding image data after resolution conversion by said resolution conversion unit;
a determination unit which determines, on the basis of image data of an image block of interest input by said input unit, whether an image of the image block of interest has a property belonging to a specific image;
a first selecting unit which, when said determination unit determines that the image of the image block of interest does not have a property belonging to a specific image, compares a data amount of the lossless encoded data generated by said lossless encoding unit and a data amount of the lossy encoded data generated by said lossy encoding unit, selects and outputs the encoded data with a smaller data amount; and
a second selecting unit which, when said determination unit determines that the image of the image block of interest has a property belonging to a specific image, selects and outputs predetermined one of the encoded data generated by said lossless encoding unit and said lossy encoding unit.

2. The apparatus according to claim 1, wherein said determination unit comprises a resolution conversion error calculating unit which calculates a resolution conversion error which occurs when said resolution conversion unit converts the image block, and, when a resolution conversion error calculated by said resolution conversion error calculating unit is not less than a first threshold, determines that the image block has the specific image property.

3. The apparatus according to claim 2, wherein said determination unit further comprises
a two-color counting unit which scans the image block of interest, and counts the number of times the number of colors which a plurality of surrounding pixels exiting around a pixel of interest becomes two during scanning, and
a run counting unit which counts a run of pixels having the same color as that of a pixel of interest during the scanning, and
determines that the image block of interest has the specific image property, provided that the number counted by said two-color counting unit is not less than a second threshold, and the run obtained by said run counting unit is not more than a third threshold.

4. The apparatus according to claim 1, further comprising a unit which adds a bit identifying whether encoded data corresponding to each output image block is losslessly encoded data or lossily encoded data to a head of the encoded data.

5. The apparatus according to claim 1, further comprising a monitoring unit which monitors a total data amount of encoded data selectively output from said first selecting unit and said second selecting unit, and determines whether the total data amount exceeds a predetermined upper limit code amount during encoding of one page, and
a setting unit which, when said monitoring unit determines that the data amount exceeds the upper limit code amount, (a) sets a parameter which increases a compression ratio as compared with a preceding compression ratio in said lossy encoding unit, (b) makes setting to cause said second selecting unit to select lossily encoded data, and (c) makes setting to cause said input unit to perform re-input operation from a start of image data as an encoding target.

6. The apparatus according to claim 5, wherein when said monitoring unit determines that the data amount exceeds the upper limit code amount, said setting unit further changes a determination condition in said determination unit.

7. A control method for an image processing apparatus which encodes image data, the method comprising the steps of:
- inputting image data as an encoding target on an image block basis;
- generating losslessly encoded data by lossless encoding image data of an image block input in the inputting step;
- converting the image data of the image block input in the inputting step into image data with a resolution lower than a resolution of the image block;
- generating lossily encoded data by lossy encoding image data after resolution conversion in the converting step;
- determining, on the basis of image data of an image block of interest input in the inputting step, whether an image of the image block of interest has a property belonging to a specific image;
- when it is determined in the determining step that the image of the image block of interest does not have a property belonging to a specific image, compares a data amount of the lossless encoded data generated by said lossless encoding unit and a data amount of the lossy encoded data generated by said lossy encoding unit, selecting and outputting the encoded data with a smaller data amount;
- when it is determined in the determining step that the image of the image block of interest does not have a property belonging to a specific image, selecting and outputting one of the encoded data generated in the lossless encoding step and the lossy encoding step which is of a predetermined type; and
- wherein the above steps are performed by at least one processor.

8. A non-transitory computer-readable storage medium storing a program, which when executed by a computer causes the computer function as an image processing apparatus which encodes image data when being read and executed by the computer, the program comprising the steps of:
- inputting image data as an encoding target on an image block basis;
- generating losslessly encoded data by lossless encoding image data of an image block input in the inputting step;
- converting the image data of the image block input in the inputting step into image data with a resolution lower than a resolution of the image block;
- generating lossily encoded data by lossy encoding image data after resolution conversion in the converting step;
- determining, on the basis of image data of an image block of interest input in the inputting step, whether an image of the image block of interest has a property belonging to a specific image;
- when it is determined in the determining step that the image of the image block of interest does not have a property belonging to a specific image, compares a data amount of the lossless encoded data generated by said lossless encoding unit and a data amount of the lossy encoded data generated by said lossy encoding unit, selecting and outputting the encoded data with a smaller data amount; and
- when it is determined in the determining step that the image of the image block of interest has a property belonging to a specific image, selecting and outputting predetermined one of the encoded data generated in the lossless encoding step and the lossy encoding step.

* * * * *